US011242657B2

(12) United States Patent
Feight (10) Patent No.: US 11,242,657 B2
(45) Date of Patent: Feb. 8, 2022

(54) FLAP FOR AN ASPHALT PAVER HOPPER

(71) Applicant: BLAW-KNOX CORPORATION, Orlando, FL (US)

(72) Inventor: Bradley Feight, Breezewood, PA (US)

(73) Assignee: BLAW-KNOX CORPORATION, Orlando, FL (US)

( * ) Notice: Subject to any disclaimer, the term of this patent is extended or adjusted under 35 U.S.C. 154(b) by 0 days.

(21) Appl. No.: 16/964,617

(22) PCT Filed: Jan. 24, 2018

(86) PCT No.: PCT/US2018/014949
§ 371 (c)(1),
(2) Date: Jul. 24, 2020

(87) PCT Pub. No.: WO2019/147224
PCT Pub. Date: Aug. 1, 2019

(65) Prior Publication Data
US 2021/0054581 A1 Feb. 25, 2021

(51) Int. Cl.
*E01C 19/48* (2006.01)
*F03G 7/06* (2006.01)

(52) U.S. Cl.
CPC .......... *E01C 19/48* (2013.01); *E01C 2301/00* (2013.01); *F03G 7/065* (2013.01)

(58) Field of Classification Search
CPC ....... E01C 19/48; E01C 2301/00; F03G 7/065
USPC .......................................... 404/75, 101, 118
See application file for complete search history.

(56) References Cited

U.S. PATENT DOCUMENTS

| 2,591,502 | A | 4/1952 | Bohannan et al. |
| 3,000,277 | A | 9/1961 | Crane et al. |
| 5,735,634 | A | 4/1998 | Ulrich et al. |
| 6,193,437 | B1 | 2/2001 | Heims |
| 2009/0263193 | A1 | 10/2009 | Mayer |
| 2010/0284739 | A1* | 11/2010 | Allsopp .................. E01F 13/12 404/6 |

FOREIGN PATENT DOCUMENTS

| CN | 202945528 U | 5/2013 |
| DE | 2847194 A1 | 5/1980 |
| UA | 83877 U | 10/2013 |

OTHER PUBLICATIONS

International Search Report and Written Opinion of the International Searching Authority, PCT/US2018/014949, dated Mar. 23, 2018, 7 pages.

* cited by examiner

*Primary Examiner* — Raymond W Addie
(74) *Attorney, Agent, or Firm* — Nixon & Vanderhye P.C.

(57) ABSTRACT

A flap for an asphalt hopper of an asphalt paver includes a sheet of a first material arranged to, in a non-deformed configuration, extend upwards from a base of the asphalt hopper and at least partially enclose one end of the asphalt hopper. The flap further includes a support member of a memory metal material coupled to the sheet. The support member has a deformed configuration and a non-deformed configuration. The support member experiences shape memory effect above a transition temperature that causes the support member in the deformed configuration to transition to the non-deformed configuration in response to heating at or above a transition temperature and also urges the sheet to return to the non-deformed configuration from a deformed configuration.

20 Claims, 8 Drawing Sheets

FLAP FOR AN ASPHALT PAVER HOPPER

CROSS REFERENCE TO RELATED APPLICATIONS

This application is a 35 U.S.C. § 371 national stage application of PCT International Application No. PCT/US2018/014949 filed on Jan. 24, 2018, the disclosures and content of which are incorporated by reference herein in their entirety.

FIELD

Embodiments relate to a flap for a hopper, and more particularly to an improved flap for an asphalt paver hopper.

BACKGROUND

Asphalt pavers are used for spreading hot asphalt across a paving surface prior to compaction of the asphalt, resulting in a smooth finished paved surface. Asphalt pavers typically include a hopper for receiving the hot asphalt, from a dump truck for example, and a conveyer belt for feeding the asphalt to a spreading mechanism at the rear of the vehicle. As asphalt is delivered into the hopper, it is common for the dump truck to inadvertently contact the hopper, which can damage both the hopper and the dump truck or other equipment.

To prevent damage to the hopper from accidental contact with the dump truck, the hopper may include one or more flexible flaps in place of a rigid front wall. The flexible flaps are sufficiently stiff and resilient at ambient temperatures (e.g., 70-80 degrees F./21-27 degrees C.) to maintain the flaps in an upright configuration. However, as the flexible flaps are exposed to high temperatures from the hot asphalt, the flaps can become more easily deformed, which may make the flaps less effective at preventing asphalt from spilling out of the hopper in front of the asphalt paver. Over time, the flaps can become permanently deformed and damaged from the prolonged heat exposure from the asphalt.

The present invention relates to an improved flap for an asphalt paver hopper.

SUMMARY

One embodiment of the inventive concepts is directed to a flap for an asphalt hopper of an asphalt paver. The flap comprises a sheet of a first material arranged to, in a non-deformed configuration, extend upwards from a base of the asphalt hopper and at least partially enclose one end of the asphalt hopper. The flap further comprises a support member of a memory metal material coupled to the sheet. The support member has a deformed configuration and a non-deformed configuration. The support member experiences shape memory effect above a transition temperature that causes the support member in the deformed configuration to transition to the non-deformed configuration in response to heating at or above a transition temperature and also urges the sheet to return to the non-deformed configuration from a deformed configuration.

Another embodiment of the inventive concepts is directed to a method. The method comprises heating a flap for an asphalt hopper of an asphalt paver from a first temperature below a transition temperature to a second temperature at or above the transition temperature. The flap comprises a sheet of a first material arranged to, in a non-deformed configuration, extend upwards from a base of the asphalt hopper and at least partially enclose one end of the asphalt hopper. The flap further comprises a support member of a memory metal material coupled to the sheet, the support member having a deformed configuration and a non-deformed configuration. Heating the flap to the second temperature causes the support member to experience shape memory effect that causes the support member in the deformed configuration to transition to the non-deformed configuration in response to heating at or above a transition temperature and also urges the sheet to return to the non-deformed configuration from a deformed configuration.

Another embodiment of the inventive concepts is directed to a method of forming a flap for a vehicle hopper. The method comprises arranging a plurality of support members of a memory metal material in an array within a mold. Each of the plurality of support members has a deformed configuration and a non-deformed configuration. Each of the plurality of support members experiences shape memory effect above a transition temperature that causes the support member in the deformed configuration to transition to the non-deformed configuration in response to heating at or above a transition temperature. The method further comprises introducing a flexible material into the mold to at least partially encapsulate the plurality of support members. The method further comprises curing the flexible material for form a flexible sheet.

Another embodiment of the inventive concepts is directed to a method of forming a flap for a vehicle hopper. The method comprises forming a plurality of recesses in an array within a sheet of flexible material. The method further comprises inserting a plurality of support members of a memory metal material in the plurality of recesses. Each of the plurality of support members has a deformed configuration and a non-deformed configuration. Each of the plurality of support members experiences shape memory effect above a transition temperature that causes the support member in the deformed configuration to transition to the non-deformed configuration in response to heating at or above a transition temperature. The method further comprises securing the plurality of support members within the plurality of recesses.

ASPECTS

According to one aspect, a flap for an asphalt hopper of an asphalt paver comprises a sheet of a first material arranged to, in a non-deformed configuration, extend upwards from a base of the asphalt hopper and at least partially enclose one end of the asphalt hopper. The flap further comprises a support member of a memory metal material coupled to the sheet. The support member has a deformed configuration and a non-deformed configuration. The support member experiences shape memory effect above a transition temperature that causes the support member in the deformed configuration to transition to the non-deformed configuration in response to heating at or above a transition temperature and also urges the sheet to return to the non-deformed configuration from a deformed configuration.

In a further aspect, the transition temperature is at or above 83 degrees F.

In a further aspect, the transition temperature is at or above 122 degrees F.

In a further aspect, the transition temperature is at or above 230 degrees F.

In a further aspect, the memory metal material is Nitinol.

In a further aspect, the memory metal material is an alloy of Nitinol and at least one of Hafnium or Palladium (Ni—Ti—X (X=Hf or Pd)).

In a further aspect, the memory metal material is at last one alloy selected from the group consisting of Silver-Cadmium (Ag—Cd), Gold-Cadmium (Au—Cd), Copper-Aluminum-Nickel (Cu—Al—Ni), Bronze (Cu—Sn), Brass (Cu—Zn), an alloy of Brass and at least one of Silicon, Aluminum, or Tin, (Cu—Zn—X (X=Si, Al, or Sn)), Iron-Platinum (Fe—Pt), Manganese-Copper (Mn—Cu), Iron-Manganese-Silicon (Fe—Mn—Si), Cobalt-Nickel-Aluminum (Co—Ni—Al), Cobalt-Nickel-Gallium (Co—Ni—Ga), Nickel-Iron-Gallium (Ni—Fe—Ga), Titanium-Niobium (Ti—Nb), and Nickel-Manganese-Gallium (Ni—Mn—Ga).

In a further aspect, the support member comprises a plurality of support members arranged in an array, each of the plurality of support members extending substantially vertically when the sheet is in the non-deformed configuration.

In some further aspects, a method comprises heating a flap for an asphalt hopper of an asphalt paver from a first temperature below a transition temperature to a second temperature at or above the transition temperature. The flap comprises a sheet of a first material arranged to, in a non-deformed configuration, extend upwards from a base of the asphalt hopper and at least partially enclose one end of the asphalt hopper. The flap further comprises a support member of a memory metal material coupled to the sheet, the support member having a deformed configuration and a non-deformed configuration. Heating the flap to the second temperature causes the support member to experience shape memory effect that causes the support member in the deformed configuration to transition to the non-deformed configuration in response to heating at or above a transition temperature and also urges the sheet to return to the non-deformed configuration from a deformed configuration.

In a further aspect, the transition temperature is at or above 83 degrees F.

In a further aspect, the transition temperature is at or above 122 degrees F.

In a further aspect, the transition temperature is at or above 230 degrees F.

In a further aspect, the memory metal material is Nitinol.

In a further aspect, the memory metal material is an alloy of Nitinol and at least one of Hafnium or Palladium (Ni—Ti—X (X=Hf or Pd)).

In a further aspect, the memory metal material is at last one alloy selected from the group consisting of Silver-Cadmium (Ag—Cd), Gold-Cadmium (Au—Cd), Copper-Aluminum-Nickel (Cu—Al—Ni), Bronze (Cu—Sn), Brass (Cu—Zn), an alloy of Brass and at least one of Silicon, Aluminum, or Tin, (Cu—Zn—X (X=Si, Al, or Sn)), Iron-Platinum (Fe—Pt), Manganese-Copper (Mn—Cu), Iron-Manganese-Silicon (Fe—Mn—Si), Cobalt-Nickel-Aluminum (Co—Ni—Al), Cobalt-Nickel-Gallium (Co—Ni—Ga), Nickel-Iron-Gallium (Ni—Fe—Ga), Titanium-Niobium (Ti—Nb), and Nickel-Manganese-Gallium (Ni—Mn—Ga).

In a further aspect, the support member comprises a plurality of support members arranged in an array, each of the plurality of support members extending substantially vertically when the sheet is in the non-deformed configuration.

In some further aspects, a method of forming a flap for a vehicle hopper comprises arranging a plurality of support members of a memory metal material in an array within a mold. Each of the plurality of support members has a deformed configuration and a non-deformed configuration. Each of the plurality of support members experiences shape memory effect above a transition temperature that causes the support member in the deformed configuration to transition to the non-deformed configuration in response to heating at or above a transition temperature. The method further comprises introducing a flexible material into the mold to at least partially encapsulate the plurality of support members. The method further comprises curing the flexible material for form a flexible sheet.

In a further aspect, the memory metal material is Nitinol.

In some further aspects, a method of forming a flap for a vehicle hopper comprises forming a plurality of recesses in an array within a sheet of flexible material. The method further comprises inserting a plurality of support members of a memory metal material in the plurality of recesses. Each of the plurality of support members has a deformed configuration and a non-deformed configuration. Each of the plurality of support members experiences shape memory effect above a transition temperature that causes the support member in the deformed configuration to transition to the non-deformed configuration in response to heating at or above a transition temperature. The method further comprises securing the plurality of support members within the plurality of recesses.

In a further aspect, the memory metal material is Nitinol.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1A:
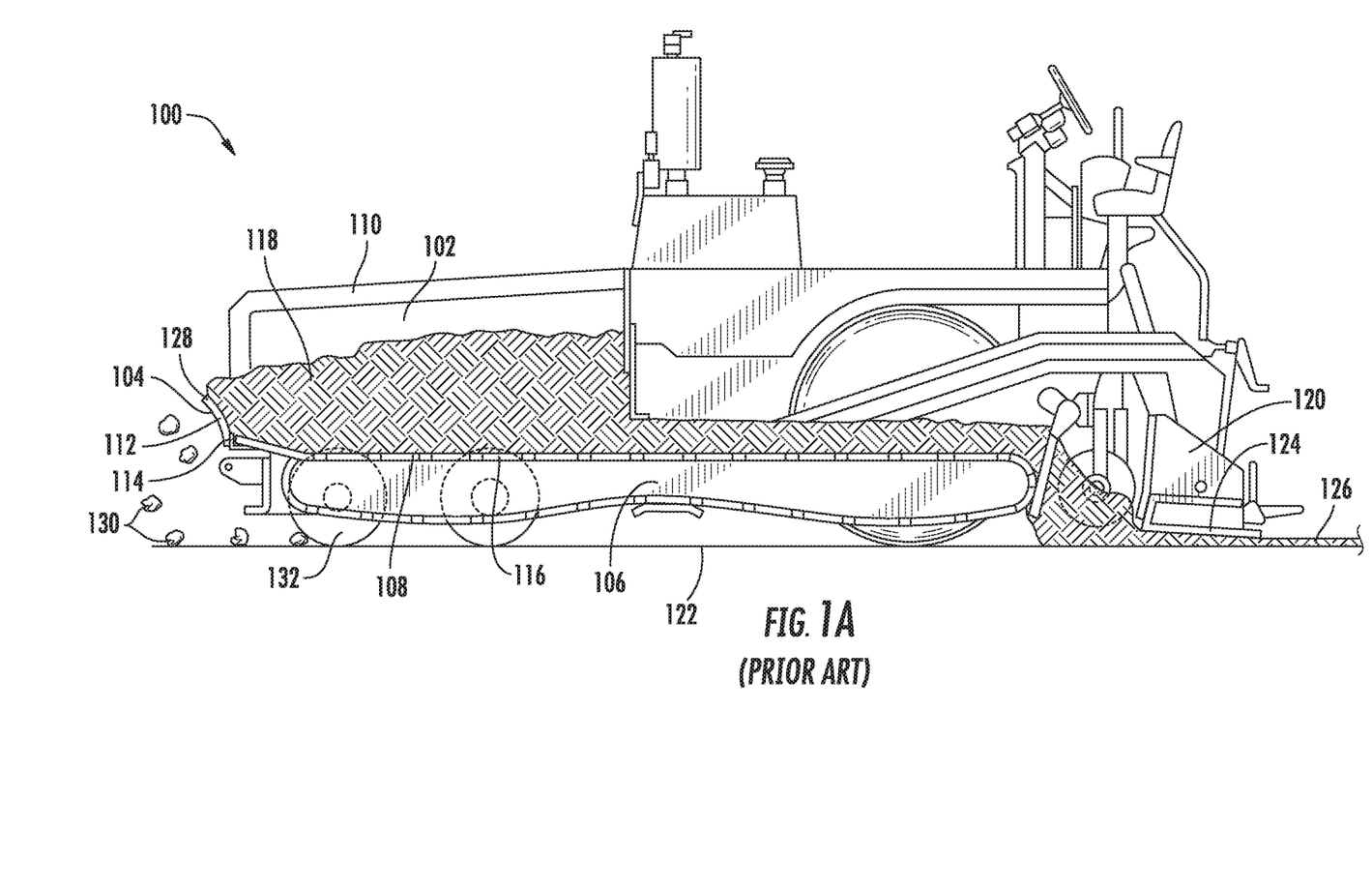
FIGS. 1A and 1B illustrate an asphalt paver having a hopper with a flexible front flap according to the prior art.
Figure 1B:
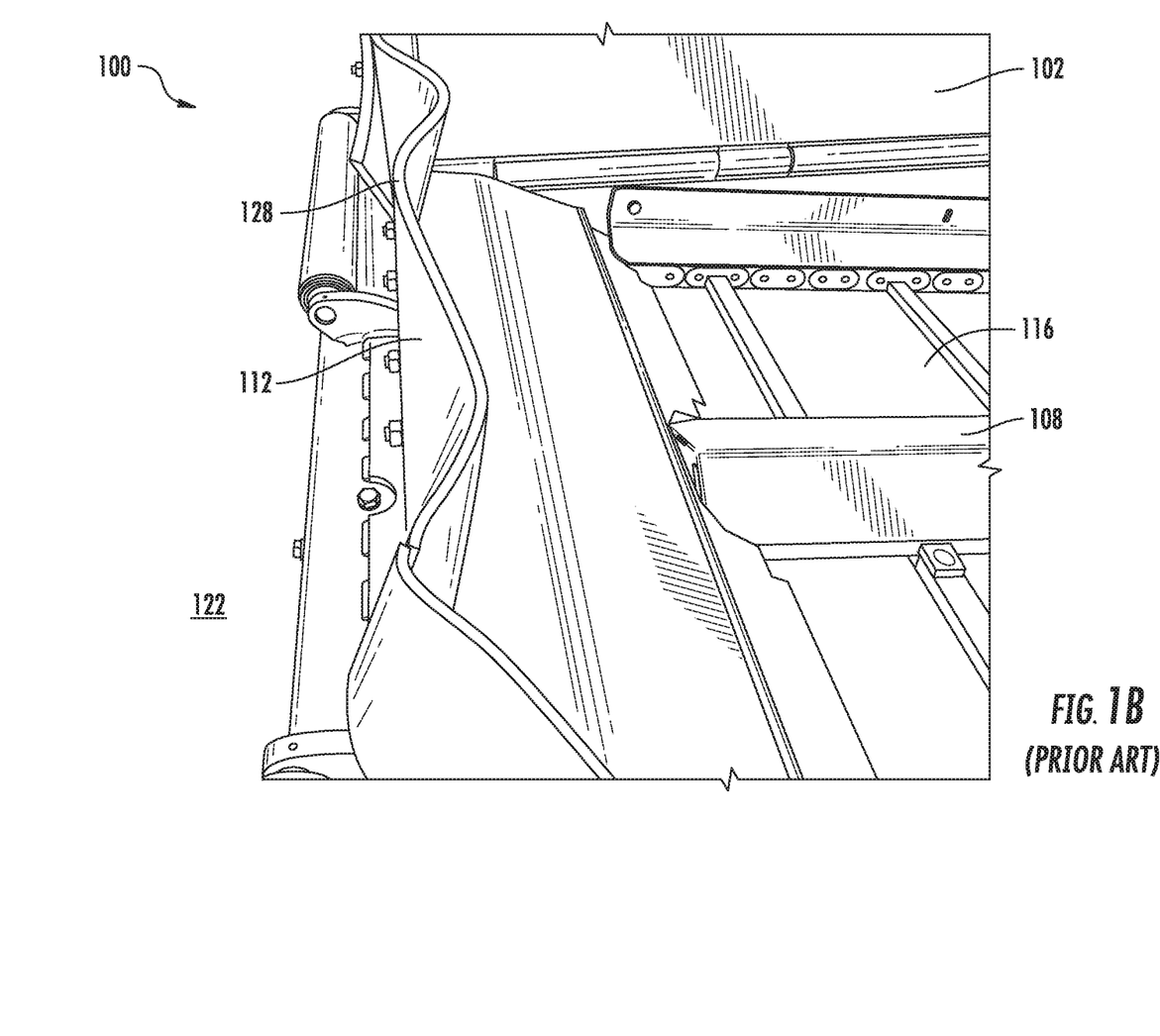

Before discussing features of the embodiments, FIGS. 1A and 1B illustrate an asphalt paver 100 having a hopper 102 and one or more hopper flaps 104 according to the prior art. The paver 100 includes a chassis 106, with a base 108 of the hopper 102 mounted on the chassis 106. The hopper flap 104 is coupled to and extends from the base 108. In this example, the hopper flap 104 extends from an upper rim 110 of the base 108 and extends laterally across the front of the base 108.

The hopper flap 104 includes one or more sheets 112 of a first material, such as plastic or rubber for example. The sheet 112 is coupled to the base 108 proximate the upper rim 110 using rivets 114 or other fastening methods, as appropriate. In normal operation, a conveyor belt 116 feeds hot asphalt 118 from the base 108 to a spreader mechanism 120. The hot asphalt 118 is deposited into the base 108 from a dump truck (not shown) or other source that is located forward of the paver 100. The spreader mechanism 120 spreads the asphalt 118 onto a paving surface 122, and a smoother 124 smooths and spreads the asphalt in a substantially even and uniform asphalt layer 126 behind the paver 100. A compacter vehicle typically (not shown) follows behind the paver 100 to compact the asphalt layer 126 to form the finished surface, which may also be referred to as a mat. The dump truck, paver 100, and compacter may move substantially in tandem, with the dump truck continuously feeding asphalt 118 into the hopper 102 of the paver as the three vehicles move forward along the paving surface 122.

The dump trucks or other delivery vehicle will often have a non-uniform height, width, and/or dump angle. As a result, it is common for a portion of the dump trucks to contact the hopper flap 104 during operation, which can cause deformation in the hopper flap 104. To prevent damage to the hopper flap 104, the first material of the sheet 112 is selected to be sufficiently stiff and resilient to maintain the sheet 112 in a non-deformed configuration, and also to be sufficiently flexible to accommodate movement caused by contact with the dump truck without permanently deforming the sheet 112. Many different types of materials may be used, ranging from rubber, which has good resilience but poor stiffness, to plastic, which has poor resilience but good stiffness.

One common problem with these types of materials is deformation caused by excessive heat. During normal operation, hot asphalt 118 may be continuously added to the hopper 102 over time, which in turn causes the hopper flap 104 to heat up as well. At these higher temperatures, which can reach 190 degrees F. to 300 degrees F. or more, the sheet 112 becomes much softer and less resilient. As a result, the asphalt 118 piled above the upper rim 110 of the base 108 pushes outwardly against the sheet 112. In addition to deformation caused by contact with the delivery vehicle, it is common for the sheet 112 to deform outwardly and downwardly in response to the force of the piled asphalt 118 alone, leading to asphalt 118 spilling over an upper rim 128 of the sheet 112 and falling in front of the paver 100. This spilled asphalt 130 can lead to uneven distribution of the asphalt 118 on the paving surface 122. Since the sheet 112 is located at the forward end of the vehicle, the spilled asphalt 130 may also pass under the wheels 132 of the paver 100 as the paver travels in the forward direction during a paving operation, which can cause the chassis 106 to move up and down and in turn cause the spreader mechanism 120 to distribute the asphalt 118 unevenly on the paving surface 122. This uneven distribution can adversely affect the pave angle and/or plane of the finished asphalt layer 126.

Although it is desirable for the sheet 112 to have some flexibility to absorb and accommodate external forces acting on the sheet 112, it is also desirable for the sheet 112 to return to its original non-deformed shape when those forces are no longer present. However, as shown in FIG. 1B, it is also common for the sheet 112 to cool in its deformed state after the hot asphalt 118 is removed from the hopper. This can lead to permanent deformation and/or damage of the sheet 112, including folding, sagging, or splitting, which significantly reduces the useful life of the hopper flap 104. For example, in the example of FIG. 1B, the stress and heat from the hot asphalt 118 has caused a wave to form in the sheet 112, making it easier for the sheet 112 to deform and for asphalt 118 to spill over the upper rim 128 of the sheet 112.

Figure 2:
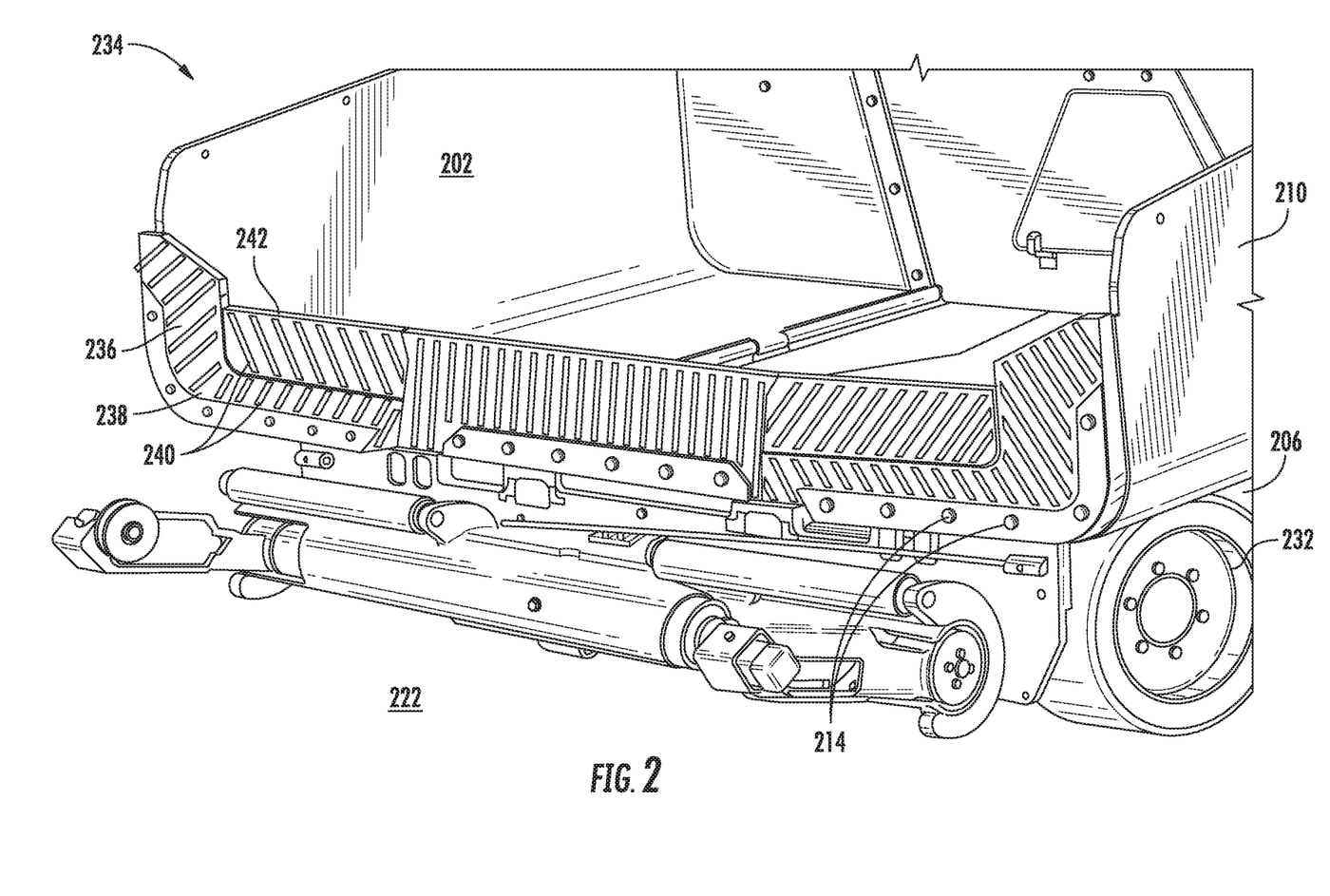
FIG. 2 illustrates a hopper for an asphalt paver having a front flap that includes a plurality of support members formed from a resilient material, such as memory metal for example, for returning the flap to a non-deformed configuration when the flap is exposed to high temperatures.

In response to these and other drawbacks, embodiments disclosed herein relate to a flap for a hopper, and more particularly to a reinforced flap for a hopper of a vehicle. In this regard, FIG. 2 illustrates an asphalt paver 234 having a hopper 202 with one or more reinforced hopper flaps 236, according to an embodiment. Similar to the paver 100 of FIGS. 1A and 1B above, the paver 234 of FIG. 2 includes a chassis 206 that supports a base 208 of the hopper 202, with one or more fasteners 214 fastening the flap 236 to the base 208. In this embodiment, the flap 236 includes a sheet 238 of a first material, such as rubber or plastic for example, and one or more support members 240 of a second material coupled to the sheet. In this example, the second material of the support members 240 is a memory metal such as Nitinol. The flap 236, sheet 238, and support members 240 extend upwardly from the base 208 of the hopper 202 and at least partially enclose one end of the hopper 202 in a non-deformed configuration. In this example, the non-deformed configuration is a substantially vertical configuration extending vertically past an upper rim 210 of the base 208, but it should be understood that the non-deformed configuration can be at one or more different angle with respect to vertical and/or horizontal, as desired.

Similar to the sheet 112 of FIGS. 1A and 1B above, the first material of sheet 238 of FIG. 2 is relatively stiff at low temperatures, such as an ambient outdoor temperature for example, and is more flexible at higher temperatures and thus susceptible to deformation. The support members 240, on the other hand, bend easy under a load at lower temperatures and experience shape memory effect at elevated temperatures. Those of ordinary skill in the art will appreciate that shape memory effect will cause the support members 240, if deformed, to remember their original shape and return to their original shape in response to heating at or above a transition temperature.

Below the transition temperature and relative to at or above the transition temperature, the support members 240 are less stiff and do not experience shape memory effect if deformed from their original shape. However, at or above the transition temperature, the support members 240 become more stiff and experience shape memory effect causing them to spring back into their original shape, i.e., to transition to the non-deformed configuration, if deformed.

In addition to the shape memory effect, which returns the sheet 238 to its original shape in the event of loading that produces a deformation in the sheet 238, one advantage of this arrangement is that the sheet 238 is less likely to permanently deform when loaded while subjected to high temperatures. For example, while the sheet 238 may be relatively stiff at ambient outdoor temperatures, e.g., about 80 degrees F. (i.e., 27 degrees C.) or less, loading the hopper with hot asphalt can expose the sheet 238 to temperatures of 190 degrees F. to 300 degrees F. (i.e., 88-149 degrees C.) or more. As the flap 236 increases in temperature, the sheet 238 becomes less stiff and less able to resist loading without the experiencing deformation. However, whereas the sheet gets less stiff at higher temperatures, the support members 240 become more stiff at higher temperatures. Therefore, as the support members 240 are heated at or above the transition temperature, the increased stiffness is better at resisting the load exerted on the flap 236 by the asphalt pushing outwardly on the flap 236 and better at maintaining the sheet 238 in the non-deformed configuration. As the flap 236 cools, the support members 240 will maintain their original shape and maintain the flap in the non-deformed configuration while the sheet 238 cools and re-stiffens. Advantageously, unlike the hopper flap 104 of FIGS. 1A and 1B, the flap 236 of FIG. 2 is less likely to permanently deform when subjected to high temperatures.

Figure 3A:
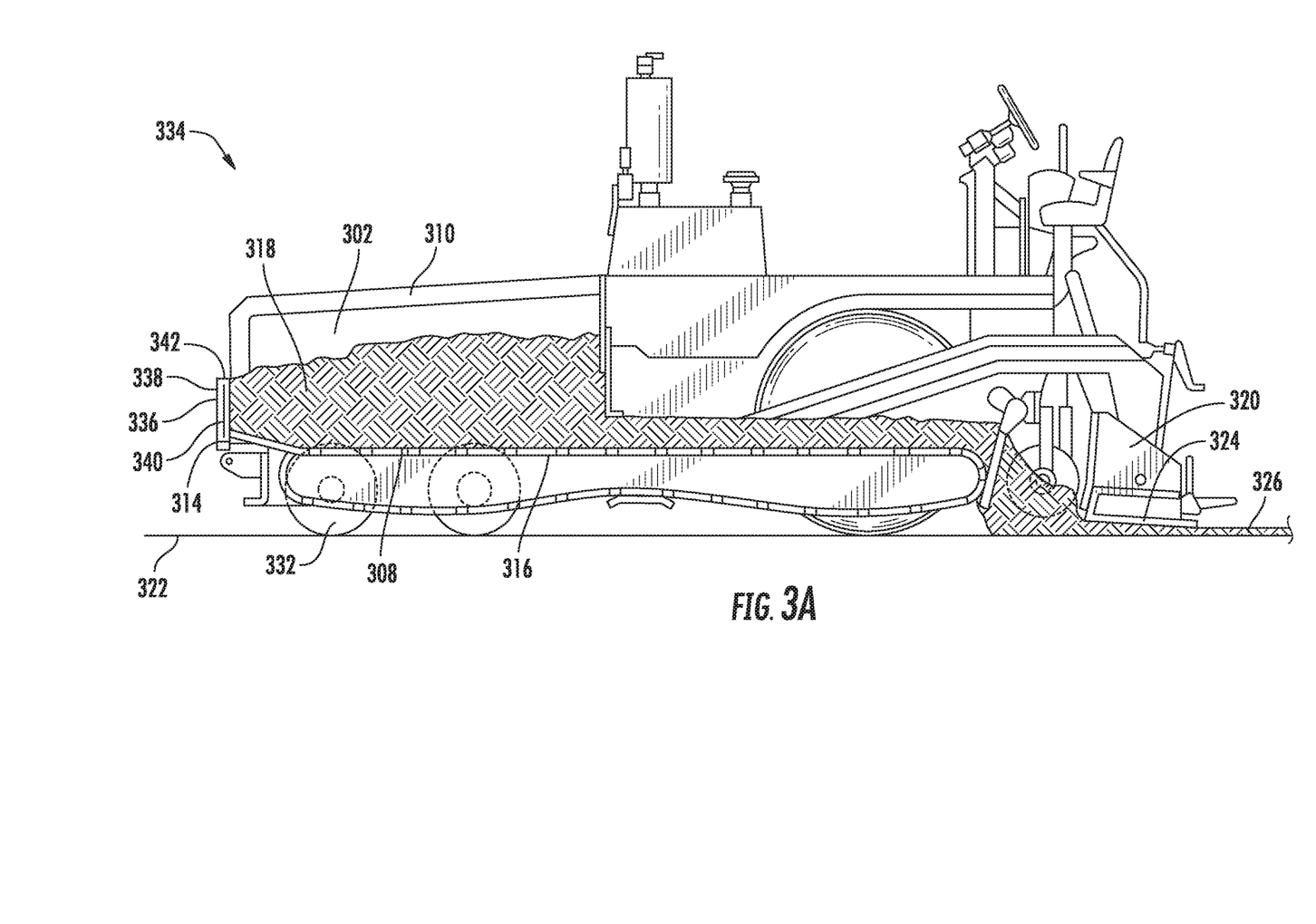
FIGS. 3A and 3B illustrate an asphalt paver having a hopper with a front flap similar to the front flap of FIG. 2, according to another embodiment.
Figure 3B:
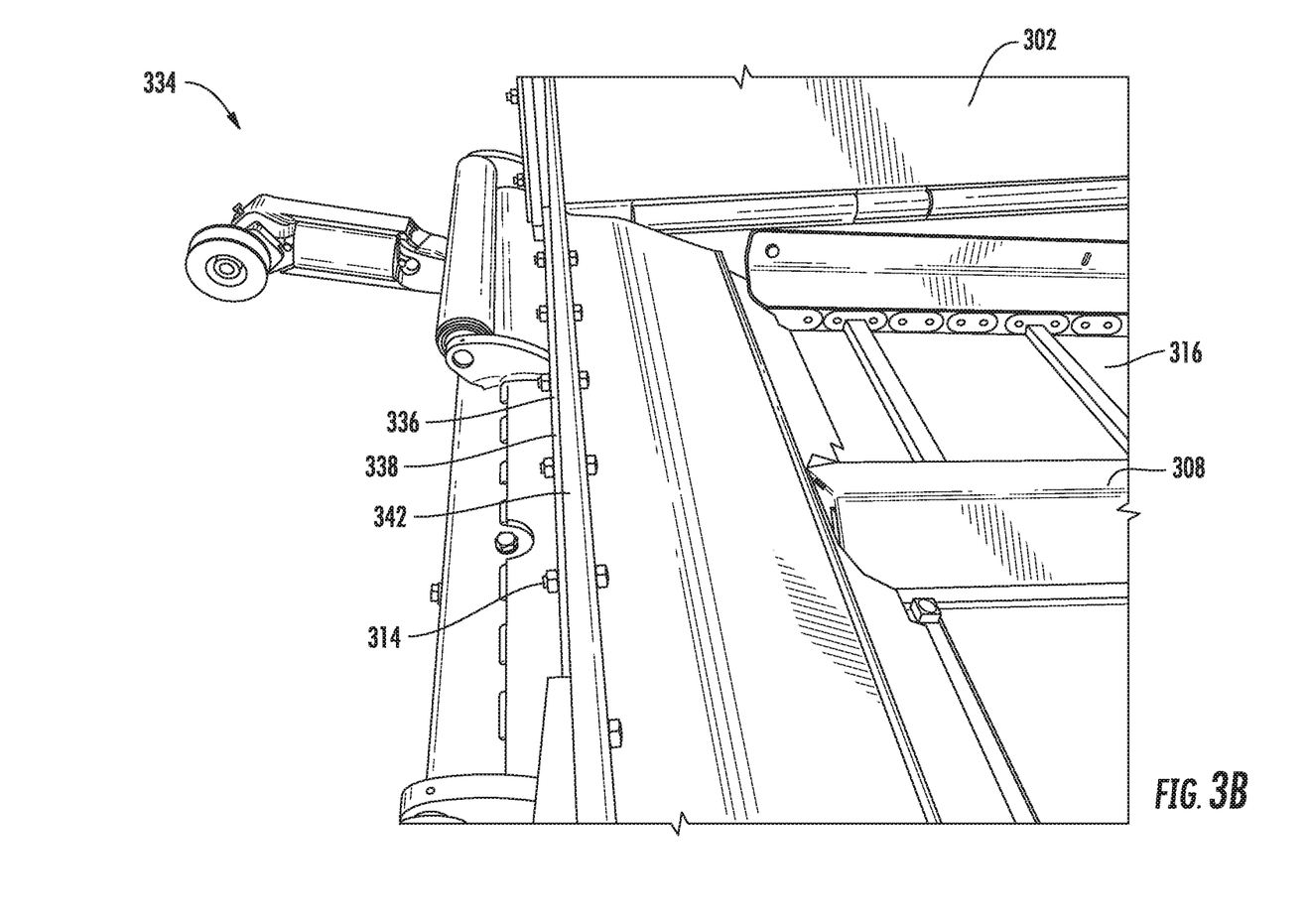

Referring now to FIGS. 3A and 3B, a paver 334 similar to the paver 234 of FIG. 2 is illustrated in an outdoor environment with a typical ambient temperature (e.g., 70-80 degrees F.), according to an embodiment. When the hopper 302 is empty, the base 308 and flap 336 will generally be at or near the same temperature. At this first temperature, the plastic and/or rubber material of the sheet 338 is relatively stiff and maintains the flap 336 in a generally upright configuration. The support members 340, on the other hand, are relatively flexible at this first temperature, which is below the transition temperature, and are relatively soft and easy to deform.

When the base 308 is loaded with hot asphalt 318, the asphalt 318 heats the hopper 302 and flap 336 to a higher second temperature (e.g., 190-300 degrees F.). At this second temperature, the sheet 338 becomes more flexible and less effective at countering the force of the asphalt 318 pushing against the flap 336. However, at the same time, the higher second temperature causes the support members 340 to stiffen and experience shape memory effect. As will be discussed in greater detail with respect to FIG. 4 below, this is because the higher temperature alters the crystalline structure of the support members 340.

As the temperatures of the hopper 302 and the flap 336 return to the ambient first temperature, if the sheet 338 is maintained in the upright configuration while the sheet 338 cools, this will allow the sheet 338 to stiffen in the non-deformed, upright configuration and avoid permanent deformation of the sheet 338. Those of ordinary skill in the art will appreciate that the decrease in temperature returns the crystalline structure of the support members 340 to their lower temperature phase, Referring now to FIG. 4, a diagram of the crystalline structure of a memory metal material 444 suitable for use as part of a support member, such as the support members 240, 340 of FIGS. 2 and 3 above, for example, is illustrated. In this example, the memory metal material 444 is a Nickel-Titanium ("Nitinol") alloy comprising a crystalline matrix of alternating Nickel (Ni) atoms 446 and Titanium (Ti) atoms 448. At ambient temperatures, e.g., 70-80 degrees F., the memory metal material 444 is in a Martensite phase, in which the bonds between the Ni atoms 446 and Ti atoms 448 arrange the atoms 446, 448 in a nested configuration, which in turn allows for the memory metal material to be deformed relatively easily. As the memory metal material 444 is heated, for example by being in contact with hot asphalt, the crystalline structure changes to an Austenite phase (see memory metal material 444'), in which the bonds between the Ni atoms 446 and Ti atoms 448 urge the atoms 446, 448 into a more rigid matrix configuration, which in turn reverses some or all of the deformation of the memory metal material 444 in the Martensite phase. As the memory metal material 444 cools and returns to the Martensite phase, the atoms 446, 448 return to a nested configuration in their original, pre-deformation arrangement.

Figure 4:
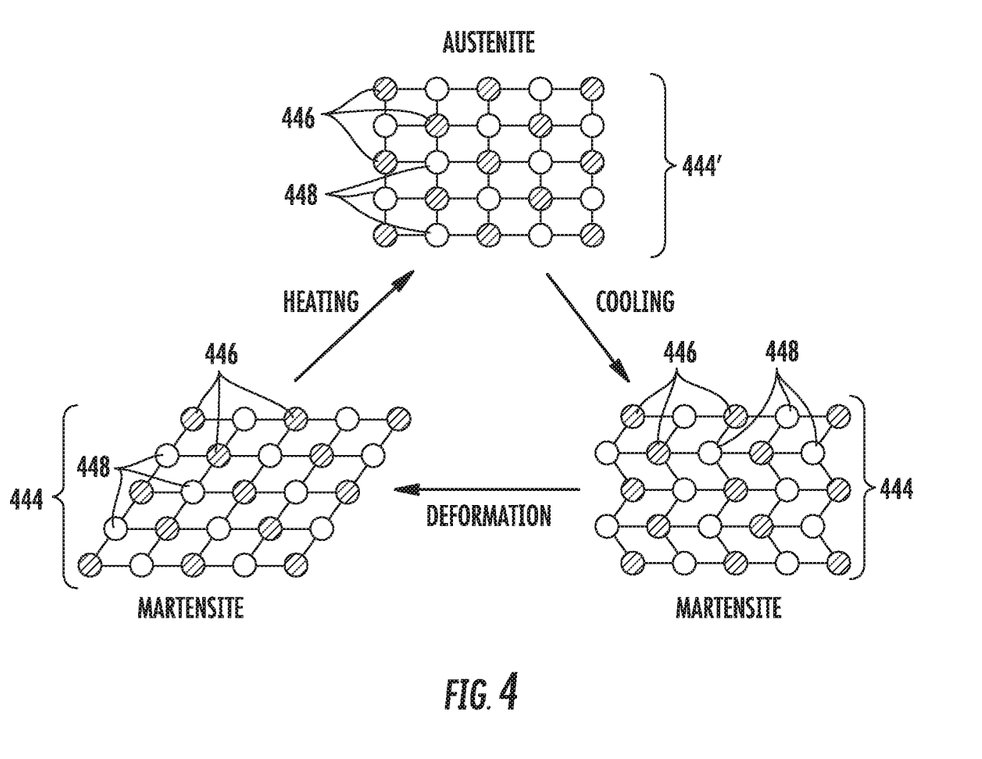
FIG. 4 illustrates a diagram of a crystalline structure of a memory metal material suitable for use as part of a support member similar to the support members of FIGS. 2-3B above, according to another embodiment.

Nitinol is one of many types of memory metals (also referred to as shape memory alloys) suitable for use with the embodiment herein. The transformation temperature of Nitinol, defined as the temperature range in which the metal transforms between the Martensite to Austenite phases, is relatively wide, with a range of −328 to 230 degrees F. (i.e., −200 to 110 degrees C.). Hysteresis, which is the narrower range of temperatures at which the material is 50% transformed to austenite (upon heating) and 50% transformed to Martensite (upon cooling) is 83 to 122 degrees F. (i.e., 30 to 50 degrees C.). In the Martensite phase, Nitinol is relatively flexible, with a Young's modulus of approximately 4E6 to 6E6 psi (i.e., 28-41 GPa) and a yield strength of 10 to 20 ksi (i.e., 70 to 140 MPa). In the Austenite phase, Nitinol is significantly more stiff and resilient, with a Young's modulus of approximately 12E6 psi (i.e., 83 GPa) and a yield strength of 28 to 100 ksi (i.e., 195 to 690 MPa).

These properties make Nitinol suitable for use with many common applications. For example, at an ambient daytime temperature of 70 to 80 degrees F., which is below the hysteresis range for Nitinol, the Nitinol support members are primarily in the Martensite phase. As hot asphalt is added to the hopper, the temperature of the Nitinol support members is raised above the hysteresis range, and eventually becomes substantially 100% transformed to the Austenite phase at temperatures above 230 degrees F. The transformation cycle can result in up to an 8% strain on the support members, reducing to 6% after 100 transformation cycles and 4% after 100,000 transformation cycles. Since the melting point of Nitinol is 2370 degrees F. (i.e., 1300 degrees C.), there is also no danger of the hot asphalt melting the Nitinol support members. Nitinol also has excellent corrosion resistance.

As noted above, Nitinol is one of many memory metal materials that may be suitable for use with the embodiments disclosed herein. Other memory metal materials include alloys of Nitinol and additional metals such as Hafnium or Palladium (Ni—Ti—X (X=Hf or Pd). Other memory metal materials that may be suitable for embodiments disclosed herein include Silver-Cadmium (Ag—Cd), Gold-Cadmium (Au—Cd), Copper-Aluminum-Nickel (Cu—Al—Ni), Bronze (Cu—Sn), Brass (Cu—Zn), Brass alloys with Silicon, Aluminum, or Tin, (Cu—Zn—X (X=Si, Al, or Sn)), Iron-Platinum (Fe—Pt), Manganese-Copper (Mn—Cu), Iron-Manganese-Silicon (Fe—Mn—Si), Cobalt-Nickel-Aluminum (Co—Ni—Al), Cobalt-Nickel-Gallium (Co—Ni—Ga), Nickel-Iron-Gallium (Ni—Fe—Ga), Titanium-Niobium (Ti—Nb), and Nickel-Manganese-Gallium (Ni—Mn—Ga). In this manner, different materials and alloys can be selected to tune the memory metal support members to provide the desired thermal and mechanical characteristics for different applications.

A number of different materials may also be suitable for use as the flexible material of the sheet in some embodiments. For example, the flexible material may include thermoplastics, such as ultra-high-molecular-weight-polyethylene (UHMW), for example. In many embodiments, UHMW has suitable stiffness and resiliency for use with asphalt pavers at ambient temperatures. However, because UHMW has a relatively low softening temperature of 175 degrees F. (i.e., 80 degrees C.), using support members as disclosed herein can help retain stiffness of the flap at temperatures higher than the softening temperature of the flexible material of the sheet.

Figure 5:
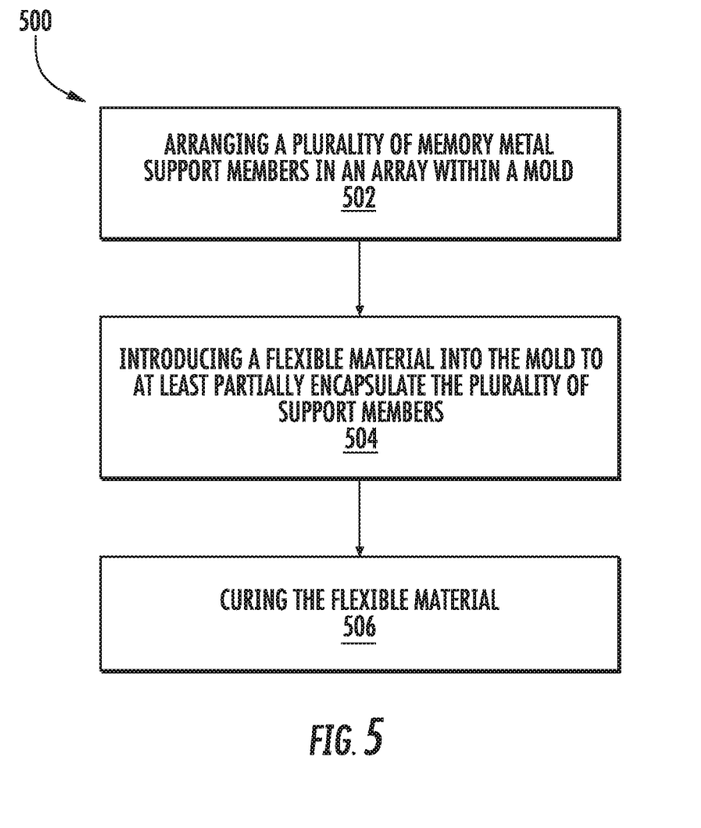
FIG. 5 is a flowchart diagram of a method for molding a flap having a plurality of support members suitable for use with the embodiments herein, according to an embodiment.

In some embodiments, the sheet may be molded to partially or fully encapsulate the memory metal support members. In this regard, FIG. 5 illustrates a flowchart diagram of a method 500 of forming a flap for a vehicle hopper, suitable for use with the embodiments disclosed herein. The method 500 comprises arranging a plurality of memory metal support members in an array within a mold (Block 502). For example, in some embodiments, the support members may be formed from memory metal as discussed in greater detail above. The method 500 further comprises introducing a flexible material into the mold to at least partially encapsulate the plurality of support members (Block 504). The method 500 further comprises curing the flexible material (Block 506).

Figure 6:
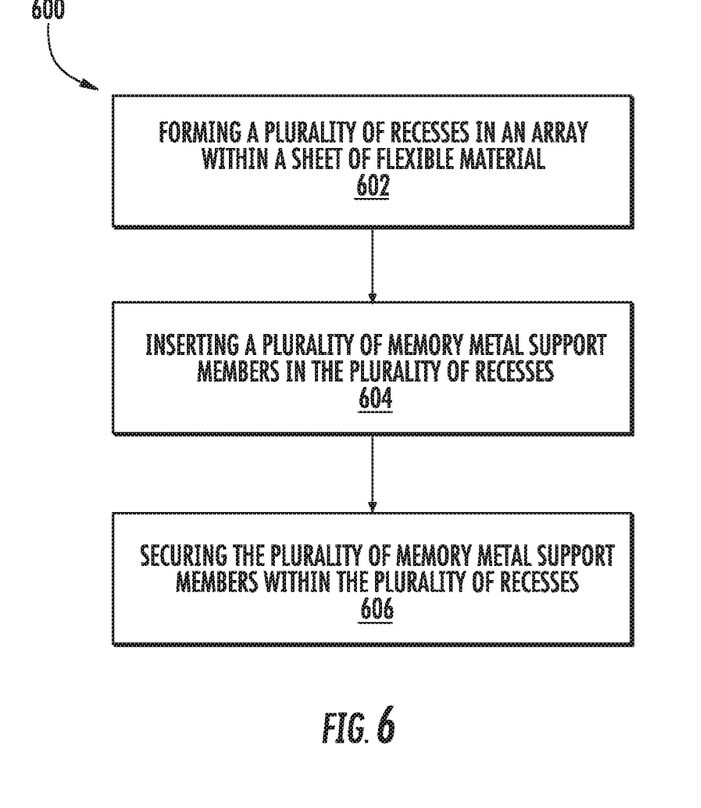
FIG. 6 is a flowchart diagram of a method for assembling a flap having a plurality of support members suitable for use with the embodiments herein, according to an embodiment.

In some embodiments, the memory metal support members may be inserted into recesses within the flexible sheet to form the flap. In this regard, FIG. 6 illustrates a flowchart diagram of a method 600 of forming a flap for a vehicle hopper, suitable for use with the embodiments disclosed herein. The method 600 comprises forming a plurality of recesses in an array within a sheet of flexible material (Block 602). The recesses may be formed by molding the flexible material, by drilling, or by other suitable methods. The method 600 further comprises inserting a plurality of memory metal support members in the plurality of recesses (Block 604). The method may also further comprises securing the plurality of memory metal support members within the plurality of recesses (Block 606). Securing the support members may be accomplished by plugging or filling the recesses behind the support members to encapsulate the support members, or by forming the recesses to frictionally retain the support members, and/or to fully or partially close behind the support members via the resiliency of the flexible material of the flap. Alternatively, the support members 240 may be removably inserted to allow replacement of one or more sections should the support members 240 experience metal fatigue.

The embodiments set forth above represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

When an element is referred to as being "connected," "coupled," "responsive," "mounted," or variants thereof to another element, it can be directly connected, coupled, responsive, or mounted to the other element or intervening elements may be present. In contrast, when an element is referred to as being "directly connected," "directly coupled," "directly responsive," "directly mounted" or variants thereof to another element, there are no intervening elements present. The term "substantially" used herein in conjunction with a numeric value means any value that is within a range of five percent greater than or five percent less than the numeric value. Like numbers refer to like elements throughout. As used herein, the singular forms "a," "an," and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first end" and "second end," and does not imply a priority, a type, an importance, or other attribute, unless otherwise stated herein.

As used herein, the terms "comprise," "comprising," "comprises," "include," "including," "includes," "have," "has," "having," or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings of inventive concepts. It will also be apparent to those of ordinary skill in the art that the above-described embodiments may be combined in whole or in part to create additional embodiments within the scope and teachings of inventive concepts. Thus, although specific embodiments of, and examples for, inventive concepts are described herein for illustrative purposes, various equivalent modifications are possible within the scope of inventive concepts, as those skilled in the relevant art will recognize. Accordingly, the scope of inventive concepts is determined from the appended claims and equivalents thereof.

What is claimed is:

1. A flap for an asphalt hopper of an asphalt paver comprising:
   a sheet of a first material arranged to, in a non-deformed configuration, extend upwards from a base of the asphalt hopper and at least partially enclose one end of the asphalt hopper; and
   a support member of a memory metal material coupled to the sheet, the support member:
      having a deformed configuration and a non-deformed configuration; and
      experiencing shape memory effect above a transition temperature that causes the support member in the deformed configuration to transition to the non-deformed configuration in response to heating at or above a transition temperature and also urges the sheet to return to the non-deformed configuration from a deformed configuration.

2. The flap of claim 1, wherein the transition temperature is at or above 83 degrees F.

3. The flap of claim 1, wherein the transition temperature is at or above 122 degrees F.

4. The flap of claim 1, wherein the transition temperature is at or above 230 degrees F.

5. The flap of claim 1, wherein the memory metal material is Nitinol.

6. The flap of claim 1, wherein the memory metal material is an alloy of Nitinol and at least one of Hafnium or Palladium (Ni—Ti—X (X=Hf or Pd)).

7. The flap of claim 1, wherein the memory metal material is at last one alloy selected from the group consisting of Silver-Cadmium (Ag—Cd), Gold-Cadmium (Au—Cd), Copper-Aluminum-Nickel (Cu—Al—Ni), Bronze (Cu—Sn), Brass (Cu—Zn), an alloy of Brass and at least one of Silicon, Aluminum, or Tin, (Cu—Zn—X (X=Si, Al, or Sn)), Iron-Platinum (Fe—Pt), Manganese-Copper (Mn—Cu), Iron-Manganese-Silicon (Fe—Mn—Si), Cobalt-Nickel-Aluminum (Co—Ni—Al), Cobalt-Nickel-Gallium (Co—Ni—Ga), Nickel-Iron-Gallium (Ni—Fe—Ga), Titanium-Niobium (Ti—Nb), and Nickel-Manganese-Gallium (Ni—Mn—Ga).

8. The flap of claim 1, wherein the support member comprises a plurality of support members arranged in an array, each of the plurality of support members extending substantially vertically when the sheet is in the non-deformed configuration.

9. A method comprising:
heating a flap for an asphalt hopper of an asphalt paver from a first temperature below a transition temperature to a second temperature at or above the transition temperature, the flap comprising:
a sheet of a first material arranged to, in a non-deformed configuration, extend upwards from a base of the asphalt hopper and at least partially enclose one end of the asphalt hopper; and
a support member of a memory metal material coupled to the sheet, the support member having a deformed configuration and a non-deformed configuration,
wherein heating the flap to the second temperature causes the support member to experience shape memory effect that causes the support member in the deformed configuration to transition to the non-deformed configuration in response to heating at or above a transition temperature and also urges the sheet to return to the non-deformed configuration from a deformed configuration.

10. The method of claim 9, wherein the transition temperature is at or above 83 degrees F.

11. The method of claim 9, wherein the transition temperature is at or above 122 degrees F.

12. The method of claim 9, wherein the transition temperature is at or above 230 degrees F.

13. The method of claim 9, wherein the memory metal material is Nitinol.

14. The method of claim 9, wherein the memory metal material is an alloy of Nitinol and at least one of Hafnium or Palladium (Ni—Ti—X (X=Hf or Pd)).

15. The method of claim 9, wherein the memory metal material is at last one alloy selected from the group consisting of Silver-Cadmium (Ag—Cd), Gold-Cadmium (Au—Cd), Copper-Aluminum-Nickel (Cu—Al—Ni), Bronze (Cu—Sn), Brass (Cu—Zn), an alloy of Brass and at least one of Silicon, Aluminum, or Tin, (Cu—Zn—X (X=Si, Al, or Sn)), Iron-Platinum (Fe—Pt), Manganese-Copper (Mn—Cu), Iron-Manganese-Silicon (Fe—Mn—Si), Cobalt-Nickel-Aluminum (Co—Ni—Al), Cobalt-Nickel-Gallium (Co—Ni—Ga), Nickel-Iron-Gallium (Ni—Fe—Ga), Titanium-Niobium (Ti—Nb), and Nickel-Manganese-Gallium (Ni—Mn—Ga).

16. The method of claim 9, wherein the support member comprises a plurality of support members arranged in an array, each of the plurality of support members extending substantially vertically when the sheet is in the non-deformed configuration.

17. A method of forming a flap for a vehicle hopper, the method comprising:
arranging a plurality of support members of a memory metal material in an array within a mold, each of the plurality of support members:
having a deformed configuration and a non-deformed configuration; and
experiencing shape memory effect above a transition temperature that causes the support member in the deformed configuration to transition to the non-deformed configuration in response to heating at or above a transition temperature;
introducing a flexible material into the mold to at least partially encapsulate the plurality of support members; and
curing the flexible material for form a flexible sheet.

18. The method of claim 17, wherein the memory metal material is Nitinol.

19. A method of forming a flap for a vehicle hopper, the method comprising:
forming a plurality of recesses in an array within a sheet of flexible material;
inserting a plurality of support members of a memory metal material in the plurality of recesses, each of the plurality of support members:
having a deformed configuration and a non-deformed configuration; and
experiencing shape memory effect above a transition temperature that causes the support member in the deformed configuration to transition to the non-deformed configuration in response to heating at or above a transition temperature; and
securing the plurality of support members within the plurality of recesses.

20. The method of claim 19, wherein the memory metal material is Nitinol.

* * * * *